United States Patent [19]
Piper et al.

[11] 3,892,824
[45] July 1, 1975

[54] S-ω-(ω-AMINOALKYLAMINO)ALKYL DIHYDROGEN PHOSPHOROTHIOATES

[75] Inventors: James R. Piper; Thomas P. Johnston, both of Birmingham, Ala.

[73] Assignee: Southern Research Institute, Birmingham, Ala.

[22] Filed: Dec. 16, 1968

[21] Appl. No.: 784,231

[52] U.S. Cl. .................. 260/944; 260/979; 424/211
[51] Int. Cl. ............................................... C07f 9/16
[58] Field of Search ............................. 260/944, 945

[56] References Cited
UNITED STATES PATENTS
2,411,527   11/1946   Dickey et al...................... 260/945
3,124,508   3/1964   Nordmann...................... 260/944 X

*Primary Examiner*—Charles B. Parker
*Assistant Examiner*—Richard L. Raymond
*Attorney, Agent, or Firm*—Roylance, Abrams, Berdo & Kaul

[57] ABSTRACT

Antiradiation agents of the formula $RHN(C_nH_{2n})NH(C_nH_{2n})SPO_3H_2$ wherein R is hydrogen or an alkyl group and each n is from 2 to 6, and hydrates or alkali metal salts thereof.

5 Claims, No Drawings

S-ω-(ω-AMINOALKYLAMINO)ALKYL DIHYDROGEN PHOSPHOROTHIOATES

This invention relates to new compounds which are useful as antiradiation agents. More particularly, this invention relates to certain novel phosphorothioates as new compositions of matter.

The development of new antiradiation agents has been a matter of increasing interest in recent years. Such compounds are potentially useful in several different areas. Thus, for example, in X-ray therapy it is desirable to provide a drug which can be administered to a subject and which will then provide protection against the harmful effects of X-ray radiation. Antiradiation agents may also be useful in providing protection against other sources of harmful radiation such as may be encountered by personnel in the fringe areas of a nuclear explosion or by space travelers. Such agents should not only afford protection against radiation but must also be non-toxic in the dosage necessary to attain such protection.

It is an object of this invention to provide a new class of compounds which, upon administration to a subject, will provide protection against the harmful effects of radiation.

It is a further object of this invention to provide such compounds of sufficiently low toxicity that they will be easily tolerated at levels which will result in a long duration of action while maintaining effective radioprotection.

These and other objects are achieved by the practice of this invention which, briefly, comprises providing compounds of the formula $RNH(C_nH_{2n})NH(C_nH_{2n})SPO_3H_2$ wherein R is hydrogen or an alkyl group containing from 1 to 7 carbon atoms and each n has a value of from 2 to 6; or hydrates and/or alkali metal salts thereof.

The novel compounds of this invention may be prepared by methods known in the art, see, for example, F. Cortese, "Organic Syntheses", Coll. Vol. II, A. H. Blatt, Ed., John Wiley and Sons, Inc., New York, N.Y., 1943, pages 91 to 93; S. Akerfeldt, Acta Chem. Scand., 14, 1980 (1960); and J. R. Piper et al., Chem. Ind. (London), 2010 (1966).

The antiradiation agents of this invention may be administered, for example, intraperitoneally from 15 to 30 minutes before irradiation in the form of a 0.3 to 5.0 percent by weight solution or suspension.

The following examples illustrate the best modes contemplated for carrying out this invention:

EXAMPLE 1

Preparation of S-2-(3-Aminopropylamino)ethyl Dihydrogen Phosphorothioate Monohydrate
$H_2N(CH_2)_3NHCH_2CH_2SPO_3H_2.H_2O$ A solution of 2-(3-aminopropylamino)ethanol (25.0 g, 0.212 mole) in 48 percent hydrobromic acid (200 ml) was distilled until 35 ml of distillate had been collected. The solution was refluxed and, periodically, more distillate was collected. The total volume of distillate removed in 7 distillation periods was 160 ml, or 80 percent of the original volume of 48 percent hydrobromic acid, and the time of continuous boiling was approximately 48 hours. The residual solution was then evaporated to dryness under reduced pressure with the aid of several added portions of methanol. The crystalline residue was thoroughly triturated with acetone, collected, and washed on the funnel with acetone. After the product had been pressed as dry as possible on the funnel, it was dissolved in a slight excess of boiling methanol and the solution was filtered. Addition of acetone to the filtrate precipitated pure N-(2-bromoethyl)-1,3-propanediamine dihydrobromide as colorless crystals, which were dried in vacuo over phosphorus pentoxide: yield 58.0 g (80%), mp 205°–206°C.

Trisodium phosphorothioate (6.93 g, 38.5 mmoles) was gradually added in small portions with vigorous stirring to water (38 ml) cooled externally by means of a water bath (15°–20°C.). To the resulting suspension was added N-(2-bromoethyl)-1,3-propanediamine dihydrobromide (13.3 g, 38.8 mmoles). After a few minutes, complete solution occurred, and N,N-dimethylformamide (19 ml) was added with continued external cooling at 15°–20°C.

After the solution had been stirred at about 20°C. for 90 minutes, it was poured into methanol (250 ml), and the mixture was refrigerated at 4°C. overnight. The white precipitate that formed was collected and pressed as dry as possible on the funnel. The damp solid was dissolved in water (40 ml), and the solution was filtered. Addition of methanol (250 ml) reprecipitated the product. After the mixture had been refrigerated about 1 hour, the product was collected and washed on the funnel, first with methanol and finally with ether. The white solid was dried in vacuo at room temperature, then exposed to ambient conditions of the laboratory for 5 hours, and bottled under nitrogen and stored in a freezer. The yield of S-2-(3-aminopropylamino)ethyl dihydrogen phosphorothioate monohydrate, mp 160°–161°C. dec., was 8.15 g (91%). Anal. Calcd for $C_5H_{15}N_2O_3PS.H_2O$: C, 25.86; H, 7.38; N, 12.07. Found: C, 25.83; H, 7.27; N, 11.81.

EXAMPLE 2

Preparation of S-3-(3-Aminopropylamino)propyl Dihydrogen Phosphorothioate Dihydrate
$H_2N(CH_2)_3NH(CH_2)_3SPO_3H_2.2H_2O$ A solution of N-(3-bromopropyl)phthalimide (21.8 g, 81.1 mmoles) and tetrahydro-2H-1,3-oxazin-2-one (8.20 g, 81.1 mmoles), in N,N-dimethylformamide (150 ml) was added dropwise over a 30 minute period to a stirred mixture of sodium hydride (60% NaH in oil dispersion; 3.24 g, 81.1 mmoles) in N,N-dimethylformamide (25 ml) with moderate external cooling so that the reaction temperature did not exceed 25°C. After the mixture had been stirred overnight at room temperature, the solvent was removed by distillation in vacuo. The residue was stirred thoroughly with water (200 ml), and the water-insoluble, off-white solid was collected and dried in vacuo over phosphorus pentoxide. Recrystallization of the crude solid (18.0 g) from toluene afforded 3-(3-phthalimidopropyl)tetrahydro-2H-1,3-oxazin-2-one, mp 133°–135°C., in 62% yield (14.5 g).

A stirred solution of 3-(3-phthalimidopropyl)tetrahydro-2H-1,3-oxazin-2-one (12.0 g, 41.6 mmoles) in 30 percent hydrogen bromide in acetic acid solution (80 ml) was slowly heated to reflux and was maintained under reflux for 0.5 hour. The cooled solution was diluted with ether (about 230 ml); and the crystalline product that separated in essentially theoretical yield was collected, washed with ether, and dried at 77°C. in vacuo over phosphorus pentoxide. Recrystallization from 95 percent ethanol gave 15.1 g (89%) of N-[3-(3-bromopropylamino)propyl]phthalimide hydrobromide, mp 199-200°C.

A stirred mixture of N-[3-(3-bromopropylamino)-propyl]phthalimide hydrobromide (13.0 g, 32.0 mmoles), 48 percent hydrobromic acid (50 ml), and glacial acetic acid (50 ml) was heated to reflux, complete solution occurring before reflux commenced. The solution was heated under reflux overnight (17 hours). The cooled solution gradually deposited phthalic acid, which was removed by filtration. The filtrate was evaporated to dryness and the white crystalline residue was dissolved in methanol and reprecipitated by the addition of ether. The material thus obtained (10.9 g) was then recrystallized from ethanol to give pure N-(3-bromopropyl)-1,3-propanediamine dihydrobromide, mp 243°-245°C. dec, in 83 percent yield (9.35 g).

N-(3-Bromopropyl)-1,3-propanediamine dihydrobromide (3.57 g, 10.0 mmoles) was added to a stirred partial solution of trisodium phosphorothioate (1.80 g, 10.0 mmoles) in water (10 ml), and stirring was continued until complete solution occurred. The solution was kept at 25°-30°C. for 2 hours and cooled to about 4°C. and N,N-dimethylformamide (5 ml) was added with stirring. Crystalline product separated immediately. Ethanol (100 ml) was added and the solid was collected, washed with ethanol, redissolved in water (60 ml), and reprecipitated by the addition of ethanol. The mixture was cooled to precipitate the product which was washed with ethanol and dried at 25°-30°C. in vacuo over sodium hydroxide pellets. Pure S-3-(3-aminopropylamino)propyl dihydrogen phosphorothioate dihydrate, mp 140°-143°C. dec, was obtained in 92% yield (2.42 g). Anal. Calcd for $C_6H_{17}N_2O_3PS.2H_2O$: C, 27.27; H, 8.01; N, 10.60; P, 11.72; S, 12.14. Found: C, 27.19; H, 7.78; N, 10.58; P, 11.73; S, 12.02.

EXAMPLE 3

Preparation of S-2-(3-Ethylaminopropylamino)ethyl Dihydrogen Phosphorothioate Hydrate
$CH_3CH_2NH(CH_2)_3NHCH_2CH_2SPO_3H_2.1.5H_2O$ A stirred mixture of N-ethyl-p-toluenesulfonamide (39.9 g, 0.200 mole), potassium carbonate (30.0 g, 0.218 mole), 3-(3-chloropropyl)-2-oxazolidinone (33.0 g, 0.202 mole), and N,N-dimethylformamide (300 ml) and was heated at 110°-120°C. for 3 hours. The mixture was allowed to cool to room temperature and was then poured into water (1.2 l.). The orange oil that separated was extracted from the aqueous mixture with two 500-ml portions of benzene; and the benzene solution was washed with water and dried over anhydrous magnesium sulfate. Benzene was removed from the clear filtered solution by evaporation under reduced pressure. Crude N-ethyl-N-[3-(2-oxo-3-oxazolidinyl)propyl]-p-toluenesulfonamide amounting to 58.5 g (90 percent yield) remained as an orange oil.

The crude N-ethyl-N-[3-(2-oxo-3-oxazolidinyl)propyl]-p-toluenesulfonamide (58.0 g, 0.178 mole) described above was dissolved along with phenol (19 g, 0.20 mole) in 30-32 percent hydrogen bromide in acetic acid solution (200 ml), and the mixture was stirred at room temperature for 3 days. Additional 30-32 percent hydrogen bromide in acetic acid solution (100 ml) was added, and the mixture was gradually heated to boiling and maintained under reflux for 24 hours. The cooled mixture, from which the product crystallized in crude form, was mixed with ether (1 l.). The crude product was collected and washed thoroughly on the funnel with ether and acetone. The solid was then recrystallized from methanol, collected with the aid of ethanol, and dried in vacuo over phosporus pentoxide to give 46.4 g (70 percent yield) of pure N-(2-bromoethyl)-N'-ethyl-1,3-propanediamine dihydrobromide, mp 262°-263°C. dec.

Pure N-(2-bromoethyl)-N'-ethyl-1,3-propanediamine dihydrobromide (14.8 g, 40.0 mmoles) was added to a stirred partial solution of trisodium phosphorothioate (7.20 g, 40.0 mmoles) in water (40 ml). After a few minutes of continued stirring, N,N-dimethylformamide (20 ml) was added. The resultant solution was kept at room temperature for 1 hour and was then chilled in an ice-water bath and stirred rapidly while N,N-dimethylformamide (100 ml) was added dropwise. The white precipitate that formed was collected with the aid of ethanol, washed thoroughly with ethanol and ether, and dried. The dried solid was dissolved in water and the solution was filtered. The filtrate was cooled in an ice bath and ethanol was added dropwise, causing precipitation of S-2-(3-ethylaminopropylamino)ethyl dihydrogen phosphorothioate as white crystals. The product was collected, washed successively with ethanol and ether, and air dried to constant weight (9.72 g). The yield of hydrated product, mp 143°-145°C. was 90 percent. Anal. Calcd for $C_7H_{19}N_2O_3PS.1.5H_2O$: C, 31.22; H, 8.23; N, 10.40; P, 11.50; S, 11.91. Found: C, 31.24; H, 7.94; N, 10.43; P, 11.1; S, 12.3.

EXAMPLE 4

Preparation of
S-2-(3-Aminopropylamino)-2-methylpropyl Dihydrogen Phosphorothioate Hydrate

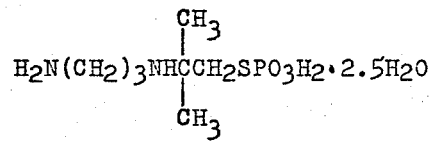

2,2-Dimethylaziridine (100 g, 1.41 moles) was added to stirred, freshly distilled acrylonitrile (64.7 g, 1.20 moles), and the resulting solution was heated to boiling and maintained under reflux for 12 hours. During this time the reflux temperature rose from 78° to 138°C. Fractionation in vacuo afforded 2,2-dimethyl-1-aziridinepropionitrile.

A solution of 2,2-dimethyl-1-aziridinepropionitrile (28.0 g, 0.254 mole) in ether (250 ml) was added dropwise to a mechanically stirred suspension of lithium aluminum hydride (10.6 g, 0.279 mole) in ether (250 ml). Stirring was continued for 6 hours. The mixture was then chilled in an ice-water bath and water (10 ml) was slowly added dropwise with vigorous stirring. Sodium hydroxide solution (20 percent, 8 ml) was then added dropwise followed by more water (35 ml). The mixture was stirred for 1 hour and filtered, and the filter cake washed with ether. Removal of the solvents from the combined filtrate and washings left an oily crude product, purification of which by vacuum distillation gave 24.0 g (74 percent yield) of 1-(3-aminopropyl)-2,2-dimethylaziridine as a colorless oil.

1-(3-Aminopropyl)-2,2-dimethylaziridine (24.0 g, 0.206 mole) was added dropwise and with rapid stirring to cold (−5°C.) 48 percent hydrobromic acid (90 ml), the temperature being maintained between −5° and 0°C. throughout the addition. The clear solution was evaporated to dryness and the residue was stirred with acetone. The acetone-insoluble white solid was collected, washed with acetone and ether, and dried in vacuo over phosphorus pentoxide. The crude product (61.7 g) was purified by a recrystallization from methanol-acetone followed by two reprecipitations from methanol solution by the addition of ether. Pure N-(2-bromo-1,1-dimethylethyl)-1,3-propanediamine dihydrobromide, mp 188°–189°C., was obtained in 54 percent yield (41.8 g).

A solution of N-(2-bromo-1,1-dimethylethyl)-1,3-propanediamine dihydrobromide (4.45 g, 12.0 mmoles) and trilithium phosphorothioate hexahydrate (2.88 g, 12.0 mmoles) in water (12 ml) was stirred at 25°–30°C. for 30 minutes. N,N-Dimethylformamide (6 ml) was added, and after 15–20 minutes the solution began depositing crystalline product. The mixture was refrigerated overnight. Ethanol (60 ml) was added and the product was collected, washed with ethanol, redissolved in water (20 ml), and then reprecipitated by the addition of ethanol (100 ml). Hydrated S-2-(3-aminopropylamino)-2-methylpropyl dihydrogen phosphorothioate was collected, washed with ethanol followed by ether, air dried, and equilibrated at 58 percent relative humidity. The product, yield 93 percent (3.21 g), formed an opaque melt at about 149°–154°C. Anal. Calcd for $C_7H_{19}N_2O_3PS \cdot 2.5H_2O$: C, 29.26; H, 8.41; N, 9.75; P, 10.79; S, 11.16. Found: C, 29.05; H, 8.10; N, 9.57; P, 11.2; S, 11.6.

Each of the foregoing compounds was evaluated by the Walter Reed Army Institute of Research as radioprotective agents in mice exposed to lethal radiation by a testing procedure described by L. Field et al., J. Med. Chem., 7, 39 (1964). The drugs were injected intraperitoneally as a 0.3–5.0 percent solution or suspension 15 to 30 minutes before irradiation in the dosages set forth in Table I. In this table, the dosage is given in mg. of compound per kg. of body weight of the mice. The mice were then exposed to lethal radiation, i.e., 825 roentgens of X-rays or 950 to 1050 roentgens of gamma rays. Table I sets forth the percentage of animals surviving at the end of 30 days. There was no 30 day survival among control mice, i.e., ones which received no antiradiation agent. The $LD_{50}$ dosages of the compounds tested are also set forth in Table I.

Table I

| Cmpd. of Ex. | Approximate $LD_{50}$, mg/kg | Drug dose, mg/kg | Vehicle of administration | pH of prepn | 30-Day survival % |
|---|---|---|---|---|---|
| 1 | 700 | 600 | Water | 6.3 | 86 |
|   |     | 300 | Water | 6.3 | 86 |
|   |     | 150 | Water | 6.5 | 40 |
|   |     | 75  | Water | 6.5 | 20 |
| 2 | 560 | 320 | CMC-Tw | 5.5 | 100 |
|   |     | 160 | CMC-Tw | 5.5 | 100 |
| 3 | 750 | 500 | Water | 6.6 | 100 |
|   |     | 250 | Water | 6.6 | 100 |
|   |     | 125 | Saline | 6.6 | 7 |
| 4 | 900 | 600 | Saline | 6.5 | 87 |
|   |     | 300 | Water | 7.5 | 80 |
|   |     | 150 | Saline | 6.5 | 20 |

By the general procedures described in the literature cited hereinabove and specifically exemplified in Examples 1 to 4, several additional antiradiation agents were synthesized and were evaluated as radioprotective agents in the manner previously described. The results are set forth in Table II, below.

Table II

| Compound | Approximate $LD_{50}$, mg/kg | Drug dose, mg/kg | Vehicle of administration | pH of prepn | 30-Day survival, % |
|---|---|---|---|---|---|
| $H_2N(CH_2)_2NH(CH_2)_2SPO_3H_2 \cdot H_2O$ | | | | | |
|   | 1300 | 800 | Water | 6.1 | 100 |
|   |      | 400 | Water | 6.1 | 100 |
|   |      | 200 | Saline | 6.5 | 27 |
|   |      | 100 | Saline | 6.5 | 0 |
| $H_2N(CH_2)_4NH(CH_2)_2SPO_3H_2$ | | | | | |
|   | 800 | 400 | Water | 7.0 | 100 |
|   |     | 200 | Water | 7.0 | 80 |
|   |     | 100 | Saline | 7.6 | 13 |
| $H_2N(CH_2)_5NH(CH_2)_2SPO_3H_2 \cdot H_2O$ | | | | | |
|   | 550 | 300 | Water | 6.9 | 100 |
|   |     | 150 | Water | 6.0 | 100 |
|   |     | 75  | Saline | 7.2 | 13 |
| $H_2N(CH_2)_6NH(CH_2)_2SPO_3H_2 \cdot H_2O$ | | | | | |
|   | 550 | 300 | Water | 7.0 | 87 |
|   |     | 200 | Saline | 7.2 | 40 |
|   |     | 150 | Water | 7.0 | 93 |
|   |     | 100 | Saline | 7.2 | 0 |

Table II — Continued

| Compound | Approximate $LD_{50}$, mg/kg | Drug dose, mg/kg | Vehicle of administration | pH of prepn | 30-Day survival, % |
|---|---|---|---|---|---|
| $H_2N(CH_2)_2NH(CH_2)_3SPO_3H_2$ | | | | | |
| | 1300 | 1000 | CMC-Tw | 6.5 | 100 |
| | | 800 | CMC-Tw | 6.5 | 83 |
| | | 500 | CMC-Tw | 6.5 | 100 |
| | | 400 | CMC-Tw | 6.5 | 67 |
| | | 200 | CMC-Tw | 6.5 | 13 |
| $H_2N(CH_2)_3NHCHCH_2SPO_3H_2 \cdot 2.5H_2O$ (with $CH_3$ branch) | | | | | |
| | 450 | 240 | Water | | 50 |
| $CH_3NH(CH_2)_2NH(CH_2)_2SPO_3H_2 \cdot 2.5H_2O$ | | | | | |
| | 900 | 400 | PB | 6.9 | 73 |
| | | 200 | PB | 6.9 | 20 |
| $CH_3NH(CH_2)_3NH(CH_2)_2SPO_3H_2 \cdot H_2O$ | | | | | |
| | 800 | 400 | PB | 7.0 | 100 |
| | | 200 | PB | 7.0 | 87 |
| | | 100 | PB | 7.5 | 46 |
| | | 50 | PB | 7.5 | 13 |

In Tables I and II, under the columns headed Vehicle of administration, "CMC-Tw" designates that the compound was dissolved or suspended in a physiological saline solution containing 0.3 percent sodium carboxymethyl cellulose and 0.1 percent Tween 80; "saline" designates a physiological saline solution; and "PB" designates the use of a phosphate buffer.

It should be understood that the foregoing description and specific examples are illustrative only. It will be understood that variations and modifications can be effected within the spirit and scope of the invention.

We claim:

1. Compounds of the formula $RHN(C_nH_{2n})NH(C_nH_{2n})SPO_3H_2$ wherein R is hydrogen or an alkyl group containing from 1 to 7 carbon atoms and each n has a value of from 2 to 6; and hydrates or alkali metal salts thereof.

2. S-2-(3-Aminopropylamino)ethyl dihydrogen phosphorothioate hydrate.

3. S-3-(3-Aminopropylamino)propyl dihydrogen phosphorothioate hydrate.

4. S-2-(3-Methylaminopropylamino)ethyl dihydrogen phosphorothioate hydrate.

5. S-2-(3-Ethylaminopropylamino)ethyl dihydrogen phosphorothioate hydrate.

* * * * *